(12) United States Patent
Yoon

(10) Patent No.: US 7,023,506 B2
(45) Date of Patent: Apr. 4, 2006

(54) REFLECTIVE LIQUID CRYSTAL DISPLAY DEVICE

(75) Inventor: Sunghoe Yoon, Anyang (KR)

(73) Assignee: LG.Philips LCD Co., Ltd., Seoul (KR)

( * ) Notice: Subject to any disclaimer, the term of this patent is extended or adjusted under 35 U.S.C. 154(b) by 435 days.

(21) Appl. No.: 10/026,483

(22) Filed: Dec. 27, 2001

(65) Prior Publication Data

US 2002/0167628 A1 Nov. 14, 2002

(30) Foreign Application Priority Data

May 11, 2001 (KR) ........................................ 2001-25709

(51) Int. Cl.
*G02F 1/1335* (2006.01)

(52) U.S. Cl. ........................ 349/106; 349/105; 349/113; 349/117; 349/121; 349/114; 349/119; 349/18

(58) Field of Classification Search ................. 349/105, 349/106, 113, 117, 121, 114, 119, 18, 112, 349/175, 96, 158, 187, 122, 162, 163
See application file for complete search history.

(56) References Cited

U.S. PATENT DOCUMENTS

| | | | | |
|---|---|---|---|---|
| 4,993,789 A | * | 2/1991 | Biles et al. | 359/15 |
| 5,812,229 A | * | 9/1998 | Chen et al. | 349/113 |
| 5,822,029 A | * | 10/1998 | Davis et al. | 349/115 |
| 6,124,919 A | * | 9/2000 | Kubo et al. | 349/162 |
| 6,273,571 B1 | * | 8/2001 | Sharp et al. | 353/122 |
| 6,504,588 B1 | * | 1/2003 | Kaneko | 349/71 |
| 6,508,560 B1 | * | 1/2003 | Epstein et al. | 359/606 |
| 6,509,983 B1 | * | 1/2003 | Klug | 359/35 |
| 6,515,729 B1 | * | 2/2003 | Hoshino | 349/158 |
| 6,667,788 B1 | * | 12/2003 | Maruyama et al. | 349/115 |
| 6,734,932 B1 | * | 5/2004 | Nakanishi et al. | 349/112 |
| 2002/0109810 A1 | * | 8/2002 | Wu | 349/113 |
| 2002/0113921 A1 | * | 8/2002 | Jiang et al. | 349/96 |
| 2002/0159019 A1 | * | 10/2002 | Pokorny et al. | 349/187 |

\* cited by examiner

*Primary Examiner*—Nathan J. Flynn
*Assistant Examiner*—Fazli Erdem
(74) *Attorney, Agent, or Firm*—McKenna Long & Aldridge LLP

(57) ABSTRACT

A reflective LCD device having a CLC color filter includes a holographic film to increase a luminance and viewing angle. Due to the holographic film, light incident to the CLC film has not only a small incident angle but also a small reflection angle. Therefore, a wavelength variation decreases. Further, since the holographic film diffuses the reflected light, a chromaticity variation also decreases. Since the reflective LCD device of the present invention further includes the diffusion film on the holographic film, the incident light can have a wide range of incident angle and the reflected light can be further diffused.

26 Claims, 5 Drawing Sheets

REFLECTIVE LIQUID CRYSTAL DISPLAY DEVICE

This application claims the benefit of Korean Patent Application No. 2001-25709 filed on May 11, 2001 in Korea, which is hereby incorporated by reference as if fully set forth herein.

BACKGROUND OF THE INVENTION

1. Field of the Invention

The present invention relates to a liquid crystal display (LCD) device and more particularly, to a reflective LCD device having a cholesteric liquid crystal (CLC) color filter layer.

2. Discussion of the Related Art

Flat panel display devices, which have properties of being thin and low weight and having low power consumption, are in high demand in the display field as the information age rapidly evolves.

The flat panel display device may be classified into two types depending on whether it emits or receives light. One type is a light-emitting type display device that emits light to display images and the other type is a light-receiving type display device that uses an external light source to display images. Plasma display panels, field emission display devices and electro luminescence display devices are examples of the light-emitting type display devices and liquid crystal displays are examples of the light-receiving type display device. The liquid crystal display device is widely used for notebook computers and desktop monitors because of its superiority in resolution, color image display and quality of displayed images.

Generally, the liquid crystal display (LCD) device has upper and lower substrates, which are spaced apart and face each other. Each of the substrates includes an electrode and the electrodes of each substrate face each other. Liquid crystal is interposed between the upper substrate and the lower substrate. Voltage is applied to the liquid crystal through the electrodes of each substrate, thereby changing an alignment of the liquid crystal molecules in accordance with the applied voltage to display images. Because the liquid crystal display device cannot emit light alone as described before, it needs an additional light source to display images. Accordingly, the liquid crystal display device has a backlight device as a light source behind a liquid crystal panel. An amount of incident light from the backlight is controlled in accordance with the alignment of the liquid crystal molecules to display images.

The electrodes of each substrate are formed of transparent conductive material and the substrates must be transparent. This type of liquid crystal display device is called a transmissive LCD device. Because the transmissive LCD device uses an artificial light source such as the backlight device, it is possible to display a bright image under dark conditions. However, the transmissive LCD device has high power consumption.

A reflective LCD device has been suggested to overcome the high power consumption problem of the transmissive LCD device. In the reflective LCD device, an opaque and reflective metallic material is used as a pixel electrode instead of the transparent conductive material. Thus, the pixel electrode made of reflective material reflects the light toward its incident direction to display images depending on the alignment of the liquid crystal molecules, and the reflective LCD device has a low power consumption compared with the transmissive LCD device. Additionally, an electrode of the upper substrate is formed of transparent conductive material to transmit the incident light.

The conventional reflective LCD device will be described hereinafter in more detail with reference to FIG. 1. FIG. 1 is a cross-sectional view of a conventional reflective liquid crystal display device. In FIG. 1, a plurality of switching elements (not shown) are disposed in the form of an array matrix on a first substrate 1, and a plurality of reflective electrodes 3 each of which is connected to each of the switching element are formed on the first substrate 1. The reflective electrode 3, which is formed of a conductive material such as metal, serves as a pixel electrode to reflect the incident light. A color filter 4 that includes sub-color-filters red (R), green (G), and blue (B) in a repeated order is formed on the rear surface of a second substrate 2 and corresponds to the reflective electrode 3. A common electrode 5 is formed of a transparent conductive material on the color filter 4. A liquid crystal layer 6 is interposed between the reflective electrode 3 and the common electrode 5 such that an alignment of liquid crystal molecules changes when a voltage is applied to the reflective electrode 3 and the common electrode 5. Although not shown in FIG. 1, alignment films (not shown) may be formed on the reflective electrode 3 and on the common electrode 5, respectively, to align the liquid crystal molecules into a predetermined direction.

A retardation layer 7 is formed on the front surface of the second substrate 2. The retardation layer 7 herein has a retardance of $\lambda/4$ and is also called a quarter wave plate (QWP). The quarter wave plate 7 converts a linearly polarized light into a circularly polarized light and vice versa. A polarizer 8, which changes ambient light into linearly polarized light by way of transmitting only light components that are parallel to the optical axis of the polarizer, is formed on the quarter wave plate 7.

If the ambient light is irradiated on the reflective liquid crystal display device when there is no voltage applied, the incident light is changed into linearly polarized light as it passes through the polarizer 8, and the linearly polarized light is changed into circularly polarized light as it passes through the quarter wave plate 7. The circularly polarized light then passes through the second substrate 2, the color filter 4 and the common electrode 5 in sequence and without the polarization. The circularly polarized light then passes through the liquid crystal layer 6. When the light passes through the liquid crystal layer 6, the circularly polarized light is converted into linearly polarized light if the liquid crystal layer 6 has a phase difference of $\lambda/4$. The linearly polarized light is reflected on the reflective electrode 3 and then is changed into circularly polarized light as it passes again through the liquid crystal layer 6. The circularly polarized light is changed into linearly polarized light as it passes again through the quarter wave plate 7 and then the linearly polarized light passes through the polarizer 8. When the light passes through the polarizer 8, if a polarizing direction of the linearly polarized light is parallel to the optical axis of the polarizer 8, all of the linearly polarized light transmits through the polarizer 8, and if the polarizing direction of the linearly polarized light is perpendicular to the optical axis of the polarizer 8, the linearly polarized light cannot transmit through the polarizer 8.

Meanwhile, cholesteric liquid crystal (CLC) display devices, which use the cholesteric liquid crystal (CLC) as a color filter to display color images, has been widely researched and developed in the field of LCD devices. A reflective CLC display device, which has a CLC color filter, is known to have a superior color reproduction and contrast ratio compared with a typical reflective LCD device that has an absorption type color filter. The CLC color filter uses a selective reflection property of the cholesteric liquid crystal. Namely, the cholesteric liquid crystal (CLC) reflects light having a certain wavelength in accordance with its helical pitch, i.e., selective reflection. That is, when all helical axes of the cholesteric liquid crystal (CLC) are aligned perpendicular to the substrate, the cholesteric liquid crystal (CLC) functions as a reflective mirror on which the incident light is reflected in the way of making the equal incidence and reflection angles with respect to a normal line to the specular surface.

However, the cholesteric liquid crystal (CLC) does not reflects all incident light but selectively reflects the incident light of a particular wavelength according to its helical pitch. Accordingly, if the helical pitch of the CLC is fixed to correspond to the red, green or blue wavelength, the CLC produces red, blue or green color. The cholesteric liquid crystal (CLC) color filter also decides a polarization state of the reflected light. If the liquid crystal molecules of the CLC are twisted counterclockwise (i.e., left-handed helical structure), the CLC reflects a left-handed circularly polarized component derived from the incident light. These characteristics distinguish the CLC from a dichroic mirror that is a mirror simply reflecting a ray of a certain wavelength and transmitting the rest of the other wavelengths (e.g., featuring infrared light reflection and visible ray transmission).

FIG. 2 is a cross-sectional view of a reflective cholesteric liquid crystal (CLC) display device that has a CLC color filter according to the related art. Because the cholesteric liquid crystal (CLC) color filter serves not only as a reflector but also as a color filter, an additional reflector is not necessary.

In FIG. 2, an absorption layer 12 is formed on the lower substrate 11 and a first alignment layer 13 is formed on the absorption layer 12. A cholesteric liquid crystal (CLC) color filter layer 14 is formed on the first alignment layer 13.

The cholesteric liquid crystal (CLC) color filter layer 14 displays red, green or blue color by reflecting light that has a wavelength corresponding to the red, green or blue color. A first transparent electrode 15 is formed on the cholesteric liquid crystal (CLC) color filter layer 14 and a second alignment layer 16 is formed on the first transparent electrode 15. A second transparent electrode 22 is formed on the rear surface of an upper substrate 21 and a third alignment layer 23 is subsequently formed on the second transparent electrode 22. A retardation layer 41 that has a retardance of λ/4 is formed on the upper substrate 21 and a polarizer 42 is formed on the retardation layer 41. A liquid crystal layer 30 is interposed between the second alignment layer 16 and the third alignment layer 23. The alignment of liquid crystal molecules changes in accordance with an electric field generated between the first transparent electrode 15 and the second transparent electrode 22.

An operating mechanism of the reflective cholesteric liquid crystal (CLC) display device, which uses a cholesteric liquid crystal (CLC) color filter, is as follows. A phase difference occurs in the liquid crystal when the voltage is applied to the transparent electrodes to generate the electric field across the liquid crystal layer.

In the normally black mode, the reflective CLC display device shows a black color when no electric field is applied to the liquid crystal layer 30. Incident light is linearly polarized as it passes through the polarizer 42 and subsequently circularly polarized as it passes through the retardation layer 41. The circularly polarized light passes through the liquid crystal layer 30 without a phase retardation and then transmits through the cholesteric liquid crystal (CLC) color filter layer 14 without a reflection, and finally absorbed by the absorption layer 12. Accordingly, there is no reflected light. Whereas when the electric field is applied to the liquid crystal layer 30, incident light is linearly polarized as it passes through the polarizer 42 and subsequently circularly polarized as it passes through the retardation layer 31. When the circularly polarized light passes through the liquid crystal layer 30, the polarization property of the circularly polarized light is changed because of phase retardation of the liquid crystal layer 30. Only the light component of a particular wavelength derived from the light transmitted through the liquid crystal layer 50 is reflected by the cholesteric liquid crystal (CLC) color filter layer 14, and the rest of the light transmits through the cholesteric liquid crystal (CLC) color filter 14 and then is absorbed by the absorption layer 12. The polarization property of the reflected light is changed as it passes again through the liquid crystal layer 30 and the reflected light is linearly polarized as it passes through the retardation layer 41. The linearly polarized light finally passes through the polarizer 42.

In the normally white mode, the reflective CLC display device shows a white color when no electric field is applied to the liquid crystal. Incident light is linearly polarized as it passes through the polarizer 42 and subsequently circularly polarized as it passes through the retardation layer 41. The circularly polarized light passes through the liquid crystal layer 30 without phase retardation. Only the light component of a particular wavelength derived from the light transmitted through the liquid crystal layer 30 is reflected by the cholesteric liquid crystal (CLC) color filter layer 14, and the rest of the light transmits through the cholesteric liquid crystal (CLC) color filter 14 and then is absorbed in the absorption layer 12. The reflected light passes again through the liquid crystal layer 30 without phase retardation and is linearly polarized as it passes through the retardation layer 41. The linearly polarized light finally passes through the polarizer 42.

When the voltage is applied to the liquid crystal, incident light is linearly polarized as it passes through the polarizer 42 and subsequently circularly polarized as it passes through the retardation layer 41. When it passes through the liquid crystal layer 30, the polarization property of the circularly polarized light is changed because of the phase retardation of the liquid crystal layer 30. All of the light transmitted through the liquid crystal layer 50 passes through the cholesteric liquid crystal (CLC) color filter layer 14 without a reflection and then is absorbed in the absorption layer 12. Accordingly, there is no reflected light.

Additionally, because the reflective liquid crystal display device uses the external light source, an incidence angle of the light varies according to a position of the light source. As described before, since the cholesteric liquid crystal (CLC) color filter creates a specular reflection, the reflection angle of the light depends on the incidence angle of the light. Whereas a luminance in a certain viewing angle is very high, the luminance in the rest of viewing angle is lowered.

In addition, since a length of the helical pitch of the cholesteric liquid crystal (CLC) helix, which the incident light experiences, is variable in accordance with the incidence angle of the incident light, the wavelength of the reflected light is changed. Accordingly, a color of the reflected light varies depending on the incidence angle of the incident light and a color change of the reflected light becomes greater as the incidence angle becomes larger.

These problems can be overcome by way of scattering the reflected light using a diffusion film over the liquid crystal panel, such that the uniform luminance in a main viewing angle range may be obtained. However, though an introduction of the diffusion film may overcome the luminance problem, there still exists a color change problem according to the incidence angle.

SUMMARY OF THE INVENTION

Accordingly, the present invention is directed to a reflective liquid crystal display device having a cholesteric liquid crystal (CLC) color filter which substantially obviates one or more of problems due to limitations and disadvantages of the related art.

An advantage of the present invention is to provide a reflective liquid crystal display (LCD) device having a cholesteric liquid crystal (CLC) color filter, which increases a luminance of displayed images.

Another advantage of the present invention is to provide a reflective liquid crystal display (LCD) device having a cholesteric liquid crystal (CLC) color filter, that implements a uniform luminance and uniform color within a main viewing angle range.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a reflective liquid crystal display device includes a first substrate; an absorption layer on the first substrate; a cholesteric liquid crystal (CLC) color filter on the absorption layer; a first electrode on the cholesteric liquid crystal (CLC) color filter; a second substrate spaced apart from the first substrate; a second electrode on the rear surface of the second substrate; a retardation layer on the front surface of the second substrate; a polarizer on the retardation layer; a holographic film on the polarizer, the holographic film reducing an angle of light incident to the polarizer; and a liquid crystal layer between the first electrode and the second electrode.

The above-mentioned device further includes a diffusion film on the holographic film. The holographic film diffracts the incident light to have an incident angle of less than about 20 degrees. The second substrate includes a thin film transistor that applies a signal to the second electrode, or the first substrate includes a thin film transistor that applies a signal to the first electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, which is illustrated in the accompanying drawings.

Figure 1:
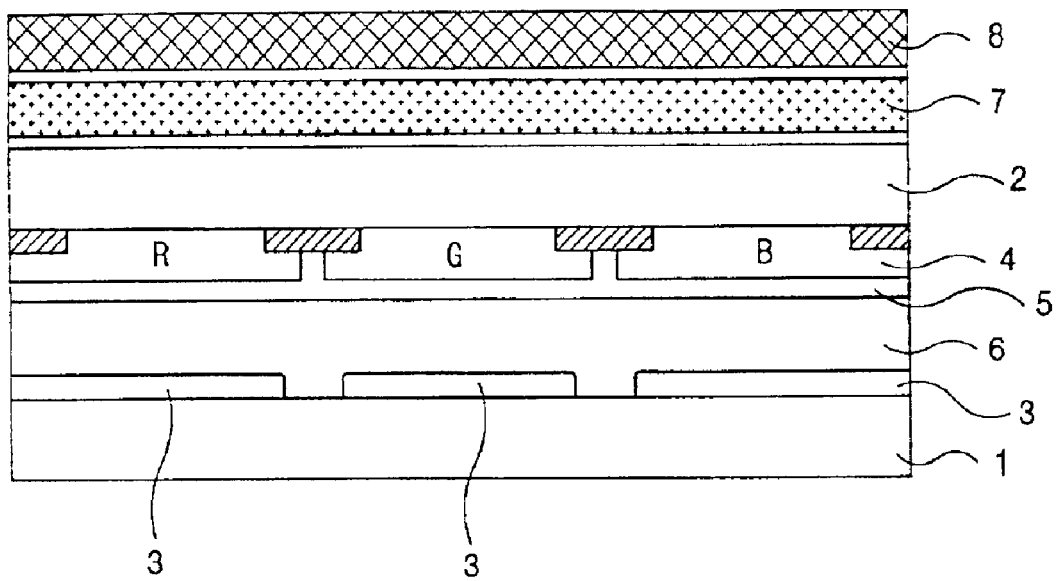
FIG. 1 is a cross-sectional view of a conventional reflective liquid crystal display device.
Figure 2:
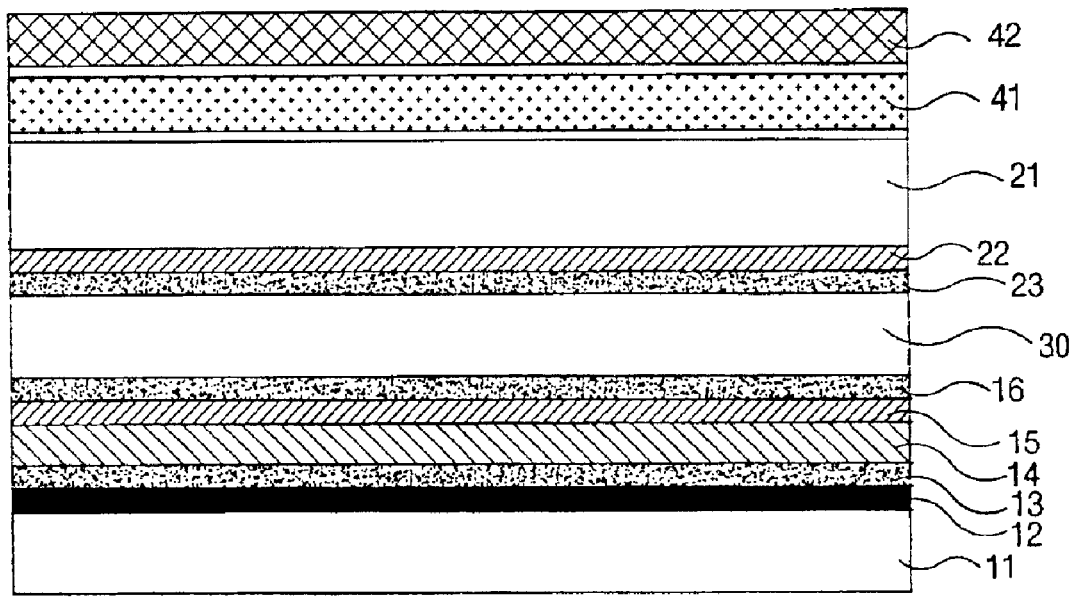
FIG. 2 is a cross-sectional view of a reflective liquid crystal display device having a cholesteric liquid crystal (CLC) color filter according to the related art.
Figure 3:
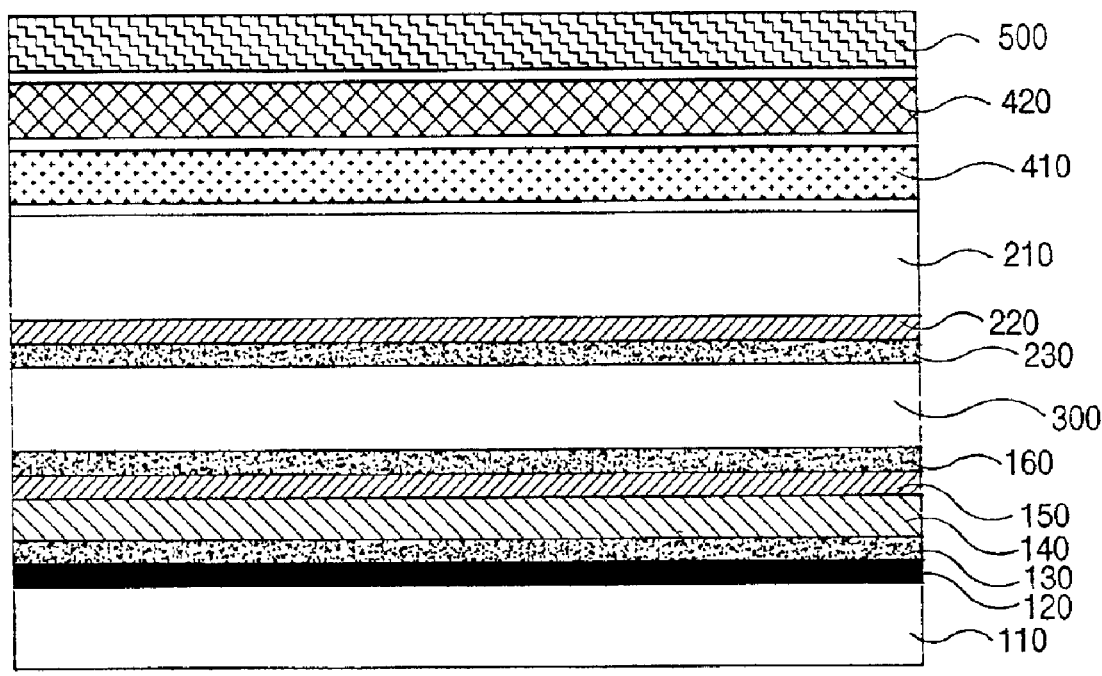
FIG. 3 is a cross-sectional view of a reflective liquid crystal display device that has a cholesteric liquid crystal (CLC) color filter according to a first embodiment of the present invention.

FIG. 3 is a cross-sectional view of a reflective liquid crystal display device that has a cholesteric liquid crystal (CLC) color filter according to a first embodiment of the present invention.

In FIG. 3, a first substrate 110 and a second substrate 210 are spaced apart from each other. The second substrate 210 is formed of transparent insulating material, whereas the first substrate 110 may be formed of transparent material or opaque material. An absorption layer 120 is formed on the first substrate 110 to absorb light. A first alignment layer 130 made of polymer is formed on the absorption layer 120. A polyimide is usually selected for an alignment layer material because it exhibits good alignment characteristics with various liquid crystal materials. A cholesteric liquid crystal (CLC) color filter layer 140, which reflects a light of particular wavelength, is formed on the alignment layer 130. The first alignment layer 130 aligns liquid crystal molecules of the cholesteric liquid crystal (CLC) color filter layer 140 in one direction. The cholesteric liquid crystal (CLC) color filter layer 140 selectively reflects incident light and the reflected light shows a red (R), green (G) or blue (B) color in each pixel region. At this time, the reflected light reflected by the cholesteric liquid crystal (CLC) color filter layer 140 does not exactly have a single wavelength but has a certain wavelength range on the basis of the main wavelength. A first electrode 150 is formed on the cholesteric liquid crystal (CLC) color filter layer 140 using transparent conductive material. A second alignment layer 160 is formed on the first electrode 150 using a material such as polyimide.

On the rear surface of the second substrate 210, a second electrode 220 is formed using the transparent conductive material and a third alignment layer 230 is formed on the second electrode 220 using material such as polyimide, for example. A liquid crystal layer 300 is interposed between the second alignment layer 160 and the third alignment layer 230. An alignment of liquid crystal molecules is changed in accordance with an electric field generated between the first electrode 150 and the second electrode 220. A retardation layer 410 and a polarizer 420 are subsequently formed on the front surface of the second substrate 210. The retardation layer 410 has the phase difference value of λ/4 and thus converts a linearly polarized light into a circularly polarized light or vice versa. The polarizer 420 transmits only the light that is parallel to its optical axis.

A holographic film 500 is disposed on the polarizer 420 according to the first embodiment of the present invention. The holographic film 500 diffracts light to reduce the incident angle of the incident light. Namely, the light incident to the polarizer 420 approaches to the vertical direction to the polarizer 420 due to the diffraction by the holographic film 500. On the other side, the reflected light having a small reflection angle after reflected by the CLC color filter layer 140 is diffused when it comes out of the holographic film 500.

As described hereinbefore, the cholesteric liquid crystal (CLC) color filter 140 selectively reflects the incident light. For example, a right-handed helical CLC reflects a right-handed circularly polarized component derived from the incident light that has a wavelength corresponding to the pitch of the right-handed helical CLC. Therefore, the cholesteric liquid crystal (CLC) color filter layer 140 in each pixel reflects incident light so as to make the reflected light show a red (R), green (G) or blue (B) color in each pixel region.

In general, since a thin film transistor serving as a switching element and a pixel electrode connected to the thin film transistor are usually formed on an upper substrate according to a conventional LCD device that has the cholesteric liquid crystal (CLC) color filter, the second electrode 220 serves as such a pixel electrode. The second electrode 220 connected to the thin film transistor corresponds to each pixel region for each color red, green or blue color. On the other hand, the thin film transistor (not shown) may alternatively be formed on the first substrate 110. If the thin film transistor is formed on the first substrate 110, the first electrode 150 serves as a pixel electrode and corresponds to each pixel region for the red, green or blue color. Thus, the first electrode 150 corresponding to each pixel region is respectively connected to the thin film transistor (not shown).

Figure 4A:
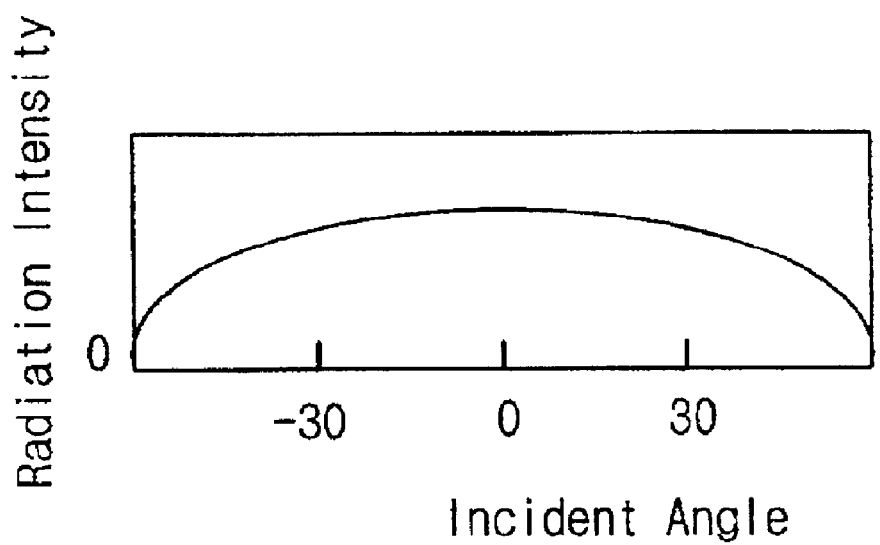
FIG. 4A is a graph showing a distribution of a radiation intensity with respect to the angle of incident light to the holographic film.
Figure 4B:
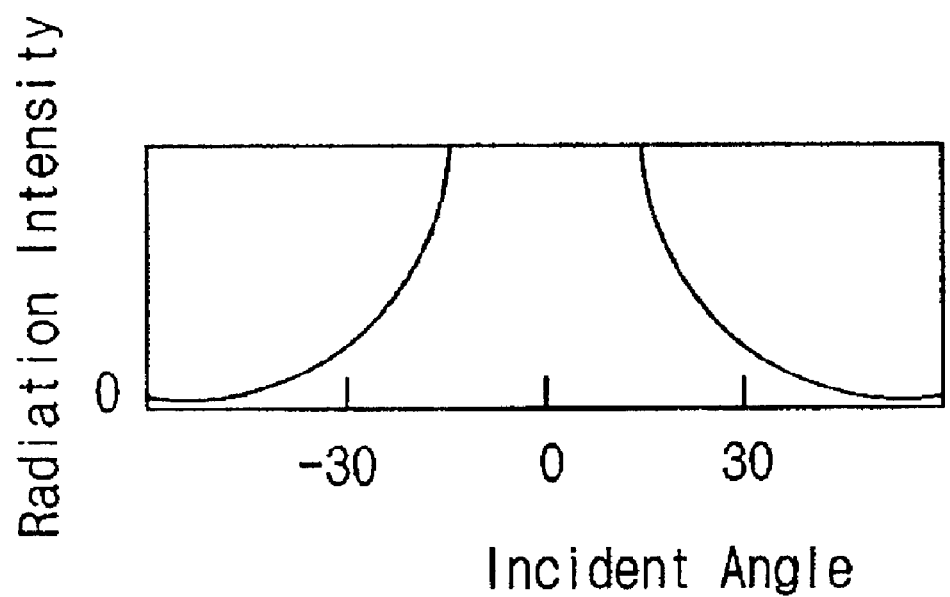
FIG. 4B is a graph showing a distribution of a radiation intensity with respect to the angle of incident light to the polarizer.

FIG. 4A is a graph showing a distribution of a radiation intensity with respect to the angle of incident light to the holographic film, and FIG. 4B is a graph showing a distribution of a radiation intensity with respect to the angle of incident light to the polarizer.

Referring to the graph of FIG. 4A, the ambient light incident to the holographic film 500 of FIG. 3 uniformly distributes within the incident angle range. Since the holographic film 500 reduces the angle of the incident light using the diffraction, the light transmitted through the holographic film 500 is directed at the polarizer 420 with the incident angle of less than about 20 degrees. Therefore, the light incident to the CLC color filter layer 140 also has a small incident angle. Since the incident light is reflected by the CLC color filter 140 that induces a specular reflection, the angle of the reflected light consequently becomes smaller. The reflected light exits through the holographic film 500 and is diffused by the holographic film 500.

Accordingly, since the incident light having a small incident angle has a small wavelength variation when it is reflected and exits, the variation of chromaticity decreases. As a result of the diffusion of the reflected light when it exits through the holographic film 500, the uniform luminance is obtained within a main viewing angle region.

Figure 5:
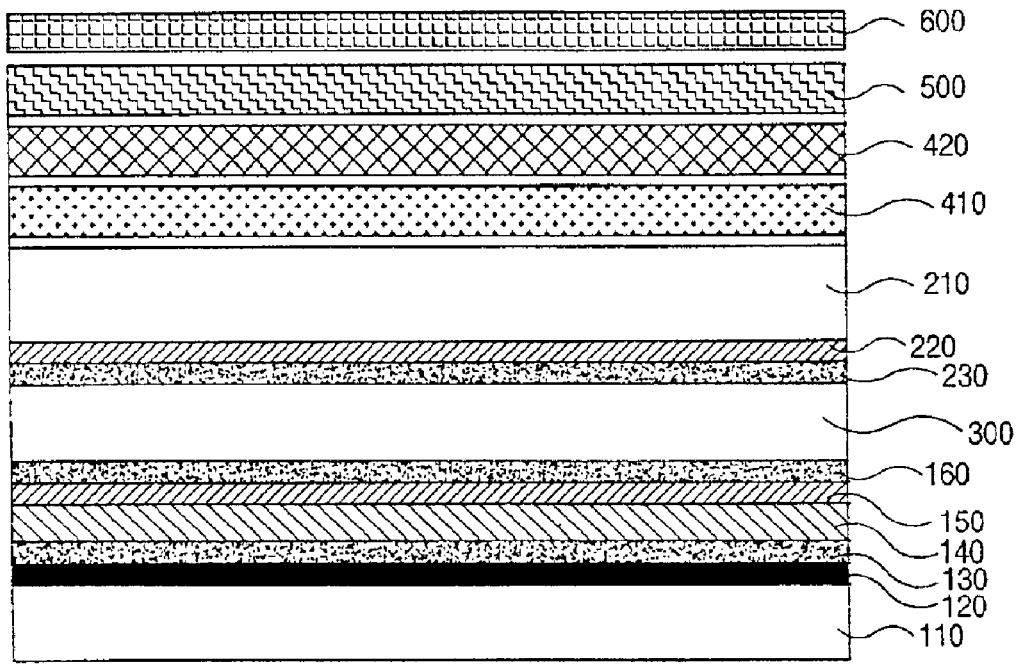
FIG. 5 is a cross-sectional view of a reflective liquid crystal display device that has a cholesteric liquid crystal (CLC) color filter according to a second embodiment of the present invention.

However, since the reflective LCD device uses the ambient light as a light source to display images, the light may be incident on the LCD panel from one direction. In this case, a diffusion film may be required to diffuse the incident light as shown in FIG. 5. FIG. 5 is a cross-sectional view of a reflective liquid crystal display device that has a cholesteric liquid crystal (CLC) color filter according to a second embodiment of the present invention.

The second embodiment shown in FIG. 5 has the same structure and configuration as the first embodiment shown in FIG. 3 except for a diffusion film 600. In FIG. 5, a first substrate 110 and a second substrate 210 are spaced apart from each other. The second substrate 210 is formed of transparent insulating material, whereas the first substrate 110 may be formed of transparent material or opaque material. An absorption layer 120 is formed on the first substrate 110 to absorb light. A first alignment layer 130 made of polymer is formed on the absorption layer 120. A polyimide is usually selected for an alignment layer material because it exhibits good alignment characteristics with various liquid crystal materials. A cholesteric liquid crystal (CLC) color filter layer 140, which reflects a light of particular wavelength, is formed on the alignment layer 130. The first alignment layer 130 aligns liquid crystal molecules of the cholesteric liquid crystal (CLC) color filter layer 140 in one direction. The cholesteric liquid crystal (CLC) color filter layer 140 selectively reflects incident light and the reflected light shows a red (R), green (G) or blue (B) color in each pixel region. At this time, the reflected light reflected by the cholesteric liquid crystal (CLC) color filter layer 140 does not exactly have a single wavelength but has a certain wavelength range on the basis of main wavelength. A first electrode 150 is formed on the cholesteric liquid crystal (CLC) color filter layer 140 using transparent conductive material. A second alignment layer 160 is formed on the first electrode 150 using a material such as polyimide.

On the rear surface of the second substrate 210, a second electrode 220 is formed using the transparent conductive material and a third alignment layer 230 is formed on the second electrode 220 using material such as polyimide, for example. A liquid crystal layer 300 is interposed between the second alignment layer 160 and the third alignment layer 230. An alignment of liquid crystal molecules is changed in accordance with an electric field generated between the first electrode 150 and the second electrode 220. A retardation layer 410 and a polarizer 420 are subsequently formed on the front surface of the second substrate 210. The retardation layer 410 has the phase difference value of λ/4 and thus converts a linearly polarized light into a circularly polarized light or vice versa. The polarizer 420 transmits only the light that is parallel to its optical axis.

A holographic film 500 is disposed on the polarizer 420. The holographic film 500 diffracts light to reduce the incident angle of the incident light. Namely, the light incident to the polarizer 420 approaches the direction vertical to the polarizer 420 due to the diffraction by the holographic film 500. On the other side, the reflected light having a small reflection angle after being reflected by the CLC color filter layer 140 is diffused when it comes out of the holographic film 500.

A diffusion film 600 is formed on the holographic film 500. The diffusion film 600 serves to diffuse the light that is incident from one side direction.

Figure 6A:
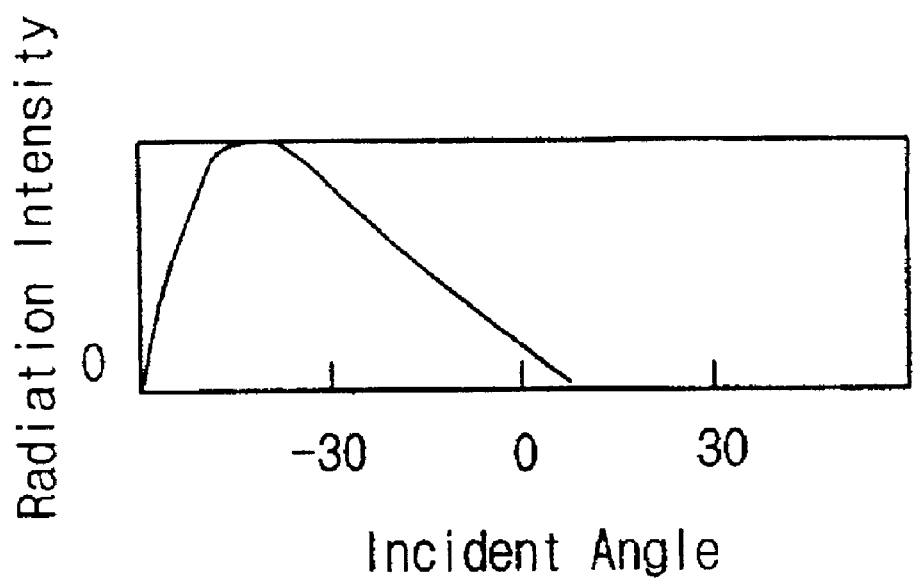
FIG. 6A is a graph showing a distribution of a radiation intensity with respect to the angle of incident light to the diffusion film.
Figure 6B:
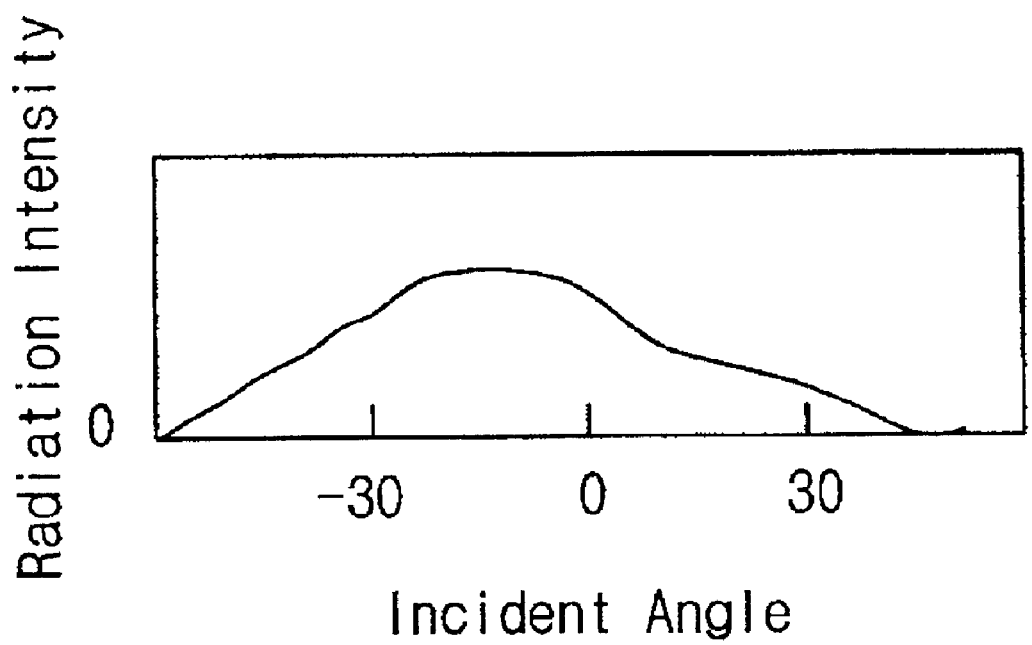
FIG. 6B a graph showing a distribution of a radiation intensity with respect to the angle of incident light to the holographic film.
Figure 6C:
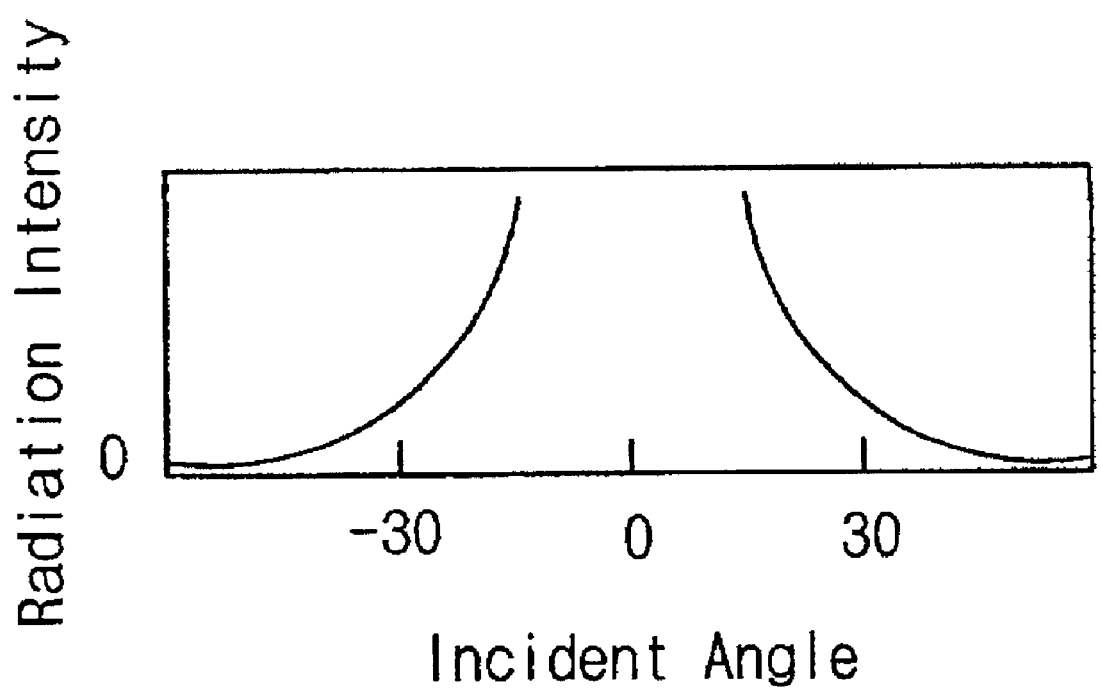
FIG. 6C is a graph showing a distribution of a radiation intensity with respect to the angle of incident light to the polarizer.

FIG. 6A is a graph showing a distribution of a radiation intensity with respect to the angle of incident light to the diffusion film, FIG. 6B a graph showing a distribution of a radiation intensity with respect to the angle of incident light to the holographic film, and FIG. 6C is a graph showing a distribution of a radiation intensity with respect to the angle of incident light to the polarizer.

Referring to the graph of FIG. 6A, the light is incident to the diffusion film 600 of FIG. 5 from the negative direction. After passing through the diffusion film 600, the incident light can have both negative and positive incident direction as shown in FIG. 6B because of the diffusion by the diffusion film 600. Thereafter, the incident light is diffracted by the holographic film 500 and then incident to the polarizer with the incident angle of less than about 20 degrees.

Therefore, as described in the first embodiment, the incident angle to the CLC color filter as well as the reflected angle of the light reflected by the CLC color filter is small. As a result, the wavelength variation of the light reflected by the CLC color filter decreases, thereby decreasing the variation of chromaticity. Furthermore, since the diffusion film 600 is on the holographic film 500, the light exiting from the holographic film 500 is further diffused by the diffusion film 600, thereby increasing the uniform luminance.

According to the principles of the present invention, the reflective LCD device having the CLC color filter includes a holographic film to increase the luminance and viewing angle. Due to the holographic film, the light incident to the CLC film has not only a small incident angle but also a small reflection angle. Therefore, the wavelength variation decreases. Further, since the holographic film diffuses the reflected light, the chromaticity variation also decreases. Since the reflective LCD device of the present invention further includes the diffusion film on the holographic film, the incident light has a wide range of incident angles and the reflected light can be further diffused.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A reflective cholesteric liquid crystal (CLC) display device, comprising:
    a first substrate;
    an absorption layer on the first substrate;
    a cholesteric liquid crystal (CLC) color filter over the absorption layer;
    a first electrode on the cholesteric liquid crystal (CLC) color filter;
    a second substrate spaced apart from the first substrate;
    a second electrode on the rear surface of the second substrate;
    a retardation layer on the front surface of the second substrate;
    a polarizer on the retardation layer;
    a holographic film on the polarizer, the holographic film for reducing an angle of light incident to the polarizer; and
    a liquid crystal layer between the first electrode and the second electrode.

2. The device according to claim 1, wherein the holographic film diffracts the incident light to have an incident angle of less than about 20 degrees.

3. The device according to claim 1, further comprising a diffusion film on the holographic film.

4. The device according to claim 1, wherein the second substrate includes a thin film transistor that applies a signal to the second electrode.

5. The device according to claim 1, wherein the first substrate includes a thin film transistor that applies a signal to the first electrode.

6. The device according to claim 1, wherein the second substrate includes a transparent insulating material.

7. The device according to claim 1, wherein the first substrate includes a transparent material.

8. The device according to claim 1, wherein the first substrate includes an opaque material.

9. The device according to claim 1, further comprising a first alignment layer on the absorption layer.

10. The device according to claim 1, wherein the reflected light from the cholesteric liquid crystal color filter layer shows one of red, green, and blue in each pixel region.

11. The device according to claim 1, wherein the first electrode includes a transparent conductive material.

12. The device according to claim 1, wherein the second electrode includes a transparent conductive material.

13. A reflective cholesteric liquid crystal (CLC) display device, comprising:
    a first substrate;
    a second substrate;
    an absorption layer formed on the first substrate;
    a first alignment layer formed on the absorption layer;
    a cholesteric liquid crystal color filter layer formed on the first alignment layer;
    a first electrode formed on the cholesteric liquid crystal color filter layer;
    a second alignment layer formed on the first electrode;
    a second electrode formed on the second substrate;
    a third alignment layer formed on the second electrode;
    a liquid crystal layer interposed between the second alignment layer and the third alignment layer;
    a retardation layer formed on the second substrate;
    a polarizer formed on the retardation layer;
    a holographic film disposed on the polarizer; and
    a diffusion film formed on the holographic film.

14. The device according to claim 13, wherein the holographic film diffracts the incident light to have an incident angle of less than about 20 degrees.

15. The device according to claim 13, wherein the second substrate includes a thin film transistor that applies a signal to the second electrode.

16. The device according to claim 13, wherein the first substrate includes a thin film transistor that applies a signal to the first electrode.

17. The device according to claim 13, wherein the second substrate includes a transparent insulating material.

18. The device according to claim 13, wherein the first substrate includes a transparent material.

19. The device according to claim 13, wherein the first substrate includes an opaque material.

20. The device according to claim 13, wherein the first alignment layer includes a polymer.

21. The device according to claim 13, wherein the reflected light from the cholesteric liquid crystal color filter layer shows one of red, green, and blue in each pixel region.

22. The device according to claim 13, wherein the first electrode includes a transparent conductive material.

23. The device according to claim 13, wherein the second electrode includes a transparent conductive material.

24. A method of manufacturing a reflective cholesteric liquid crystal (CLC) display device, comprising:

forming a first substrate;

forming an absorption layer on the first substrate;

forming a cholesteric liquid crystal (CLC) color filter on the absorption layer;

forming a first electrode on the cholesteric liquid crystal (CLC) color filter;

forming a second substrate spaced apart from the first substrate;

forming a second electrode on the rear surface of the second substrate;

forming a retardation layer on the front surface of the second substrate;

forming a polarizer on the retardation layer;

forming a holographic film on the polarizer, the holographic film for reducing an angle of light incident to the polarizer; and forming a liquid crystal layer between the first electrode and the second electrode.

25. A method of manufacturing a reflective cholesteric liquid crystal (CLC) display device, comprising:

forming a first substrate;

forming a second substrate;

forming an absorption layer on the first substrate;

forming a first alignment layer on the absorption layer;

forming a cholesteric liquid crystal color filter layer on the first alignment layer;

forming a first electrode on the cholesteric liquid crystal color filter layer;

forming a second alignment layer on the first electrode;

forming a second electrode on the second substrate;

forming a third alignment layer on the second electrode;

forming a liquid crystal layer interposed between the second alignment layer and the third alignment layer;

forming a retardation layer on the second substrate;

forming a polarizer on the retardation layer;

forming a holographic film disposed on the polarizer; and forming a diffusion film on the holographic film.

26. The device according to claim 9, wherein the first alignment layer includes a polymer.

* * * * *